US012630071B2

(12) United States Patent　　　　　(10) Patent No.:　US 12,630,071 B2
Kim　　　　　　　　　　　　　　　　　　(45) Date of Patent:　May 19, 2026

(54) LAMP FOR VEHICLE

(71) Applicant: HYUNDAI MOBIS CO., LTD., Seoul (KR)

(72) Inventor: Myeong Je Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 57 days.

(21) Appl. No.: 18/905,359

(22) Filed: Oct. 3, 2024

(65) Prior Publication Data

US 2025/0360865 A1　　Nov. 27, 2025

(30) Foreign Application Priority Data

May 24, 2024　(KR) ......................... 10-2024-0067961

(51) Int. Cl.
B60Q 1/00　　　　　(2006.01)
(52) U.S. Cl.
CPC ......... B60Q 1/0017 (2013.01); B60Q 1/0064 (2013.01)
(58) Field of Classification Search
CPC ...... B60Q 1/0017; B60Q 1/0064; B60Q 5/00; F21V 33/0056; G10K 9/13; G10K 9/20
USPC ........................................................ 362/459
See application file for complete search history.

(56) References Cited

U.S. PATENT DOCUMENTS

| | | | |
|---|---|---|---|
| 12,480,652 B1 * | 11/2025 | Kim ......................... | B60Q 5/00 |
| 2013/0312656 A1 * | 11/2013 | Tatara ................... | B60Q 5/008 |
| | | | 116/28 R |
| 2013/0322106 A1 * | 12/2013 | Tatara ..................... | B60Q 1/26 |
| | | | 362/520 |
| 2025/0360872 A1 * | 11/2025 | Kim ..................... | B60Q 1/0017 |

* cited by examiner

*Primary Examiner* — Keith G. Delahoussaye
(74) *Attorney, Agent, or Firm* — NSIP Law

(57)　　　　　ABSTRACT

A lamp for a vehicle including a lamp housing part configured to accommodate a light source in an internal lamp housing part space defined therein, an outer lens part coupled to one side of the lamp housing part and configured to cover the internal lamp housing part space, and a vibration part fixed to the lamp housing part, the vibration part including a first module fixed to a first side of the lamp housing part and a second module fixed to a second side of the lamp housing part and configured to face the first module, the first module includes a first magnet, and the second module including a second magnet configured to face the first magnet, a second magnet fixing portion configured to accommodate the second magnet, and a coil member provided at one side of the second magnet and accommodated in the second magnet fixing portion.

20 Claims, 23 Drawing Sheets

LAMP FOR VEHICLE

CROSS-REFERENCE TO RELATED APPLICATION

This application claims priority the benefit under 35 USC § 119 (a) of Korean Patent Application No. 10-2024-0067961 filed in the Korean Intellectual Property Office on May 24, 2024, the entire disclosure of which is incorporated herein by reference for all purposes.

TECHNICAL FIELD

The present disclosure relates to a lamp for a vehicle.

BACKGROUND ART

Recently, with the increasing demand for entertainment functions in addition to transportation functions required for vehicles, there has been a growing need for lamps mounted in the vehicles to have additional functions in addition to simple lighting functions. For example, recently, a lamp for a vehicle has additionally adopted a function capable of performing communication with the outside.

In the related art, the lamp for a vehicle performs the function of communication with the outside by means of visual information such as lighting images or light distribution patterns of the lamp for a vehicle. Meanwhile, the methods of performing the function of communication with the outside also include a method using auditory information, such as sounds, in addition to the method using visual information. However, because the lamp for a vehicle in the related art adopts a watertight structure to prevent moisture from accumulating in the lamp for a vehicle, it is difficult to mount a speaker, which is configured to output a sound, in the lamp for a vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a lamp for a vehicle including a lamp housing part configured to accommodate a light source in an internal lamp housing part space defined therein, an outer lens part coupled to one side of the lamp housing part and configured to cover the internal lamp housing part space, and a vibration part fixed to the lamp housing part, the vibration part including a first module fixed to a first side of the lamp housing part and a second module fixed to a second side of the lamp housing part and configured to face the first module, the first module includes a first magnet, and the second module including a second magnet configured to face the first magnet, a second magnet fixing portion configured to accommodate the second magnet, and a coil member provided at one side of the second magnet and accommodated in the second magnet fixing portion.

The first module may include a first magnet fixing portion to which the first magnet is fixed and the first magnet fixing portion may be bonded to the lamp housing part.

The coil member may be configured to surround an outer periphery of the second magnet.

The lamp housing part may include two first protruding sections protruding from an inner surface of the lamp housing part and spaced apart from each other, and the second magnet fixing portion may include a frame body region configured to accommodate the second magnet and the coil member in a frame body region internal space defined therein and two frame extension regions being configured to extend from opposite sides of the frame body region, and the two frame extension regions may be inserted between the two first protruding sections.

The two frame extension regions may be configured to extend in parallel with a first direction in which the two first protruding sections respectively protrude from the inner surface of the lamp housing part.

The two first protruding sections each may include a first-first protruding section configured to protrude from the inner surface of the lamp housing part and first-second protruding sections configured to extend from opposite sides of the first-first protruding section in a second direction in which the first-second protruding sections surround a respective frame extension region of the two frame extension regions.

A respective frame extension region and a first protruding section of the two frame extension regions and the two first protruding sections may be configured to be in contact with each other, a first concave-convex portion having a concave-convex shape may be formed in a region of the frame extension region that faces the first protruding section, and a second concave-convex portion, which is configured to engage with the first concave-convex portion, may be formed in a region of the first protruding section that corresponds to the first concave-convex portion.

The lamp housing part may include second protruding sections bent from the first protruding sections, the two frame extension regions may extend in a third direction away from the opposite sides of the frame body region and extend in parallel with a fourth direction in which the second protruding sections extend, and the two frame extension regions and the frame body region may be accommodated in a first space defined by the first protruding sections and the second protruding sections.

The two first protruding sections may be configured to protrude from a lower region of the inner surface of the lamp housing part that extends in a fifth direction intersecting an upward/downward direction and the second protruding sections may include two second protruding sections respectively bent from the two first protruding sections and spaced apart from each other.

The two second protruding sections each may include a second-first protruding section having a first length defined by a distance in which the second-first protruding section being bent and extending from the first protruding section and a second-second protruding section connected to the second-first protruding section and having a second length defined by the second-second protruding section being bent and extending from the first protruding section, the second length may be shorter than the first length, and the frame body region may be provided in a second space defined between the second-second protruding sections of the respective two second protruding sections.

The frame body region may be configured to face a stepped section, the stepped section being configured to connect the second-first protruding section and the second-second protruding section.

The lamp housing part may include two protruding sections configured to protrude from an inner surface of the lamp housing part and spaced apart from each other and hook sections bent from the two protruding sections, the second magnet fixing portion may include a frame body region configured to accommodate the second magnet and the coil member and two frame extension regions bent and extending from two opposite sides of the frame body region, and hook holes having shapes corresponding to the hook sections may be respectively formed in the two frame extension regions, and the hook sections may be inserted into the hook holes.

The two protruding sections may protrude from a lower region of the inner surface of the lamp housing part that extends in a sixth direction intersecting an upward/downward direction.

The two protruding sections may protrude from a region of the inner surface of the outer lens part that extends in a seventh direction intersecting a horizontal direction.

The lamp housing part may include two extension sections protruding from the inner surface of the lamp housing part and provided between the two protruding sections and the two frame extension regions may be interposed between the protruding sections and the extension sections.

In a general aspect, here is provided a lamp for a vehicle including a lamp housing part configured to accommodate a light source in an internal lamp housing part space defined therein, an outer lens part coupled to one side of the lamp housing part and configured to cover the internal lamp housing part space, and a vibration part fixed to the outer lens part, the vibration part including a first module fixed to a first side of the outer lens part and a second module fixed to a second side of the outer lens part and configured to face the first module, the first module including a first magnet, and the second module including a second magnet configured to face the first magnet, a second magnet fixing portion configured to accommodate the second magnet, and a coil member provided at one side of the second magnet and accommodated in the second magnet fixing portion.

The outer lens part may include two first protruding sections protruding from an inner surface of the outer lens part and spaced apart from each other, the second magnet fixing portion may include a frame body region configured to accommodate the second magnet and the coil member in a frame body region internal space defined therein and two frame extension regions being configured to extend from opposite sides of the frame body region, and the two frame extension regions may be inserted between the two first protruding sections.

The two first protruding sections may protrude from a region of the inner surface of the outer lens part that extends in a direction intersecting a horizontal direction and a second protruding section may be bent from the two first protruding sections and connects the two first protruding sections.

The second magnet fixing portion may be inserted into a space defined by the two first protruding sections and the second protruding section.

The second magnet fixing portion and the second protruding section may be configured to be in contact with each other, a first concave-convex portion having a concave-convex shape may be formed in a region of the second magnet fixing portion that faces the second protruding section, and a second concave-convex portion, which is configured to engage with the first concave-convex portion, may be formed in a region of the second protruding section that corresponds to the first concave-convex portion.

Figure 1:
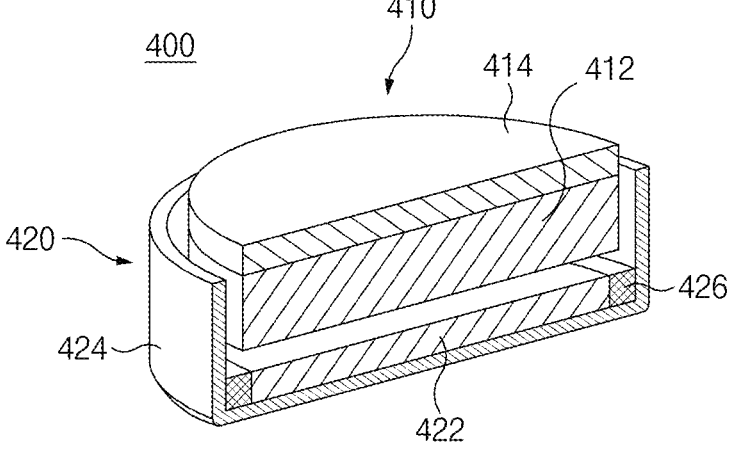
FIG. 1 is a view illustrating a cross-sectional structure of a vibration part provided in a lamp for a vehicle according to the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, a lamp for a vehicle according to the present disclosure will be described with reference to the drawings.

Lamp for Vehicle

Figure 2:
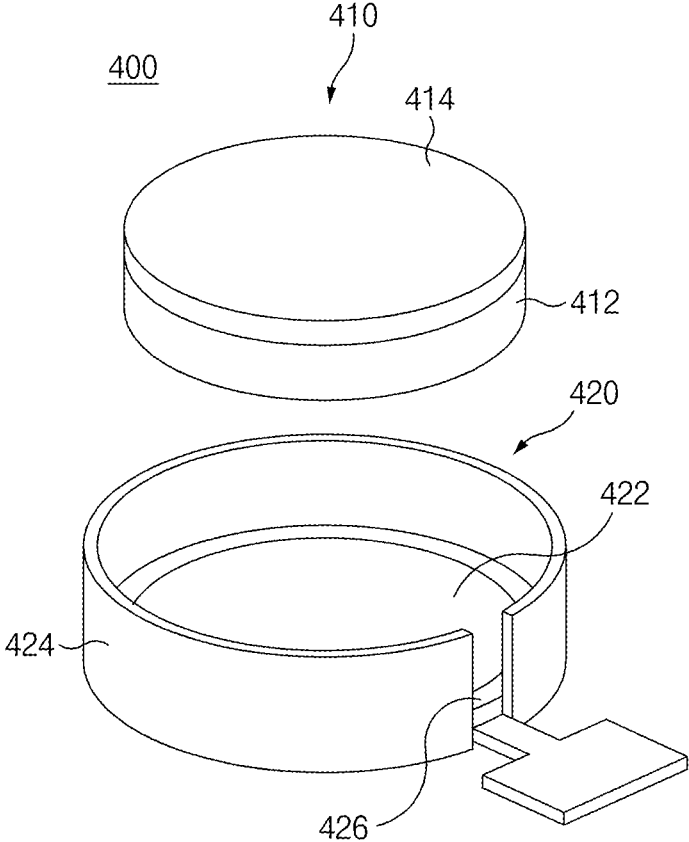
FIG. 2 is a view illustrating a state in which a first module and a second module of the vibration part provided in the lamp for a vehicle according to the present disclosure are spaced apart from each other.
Figure 3:
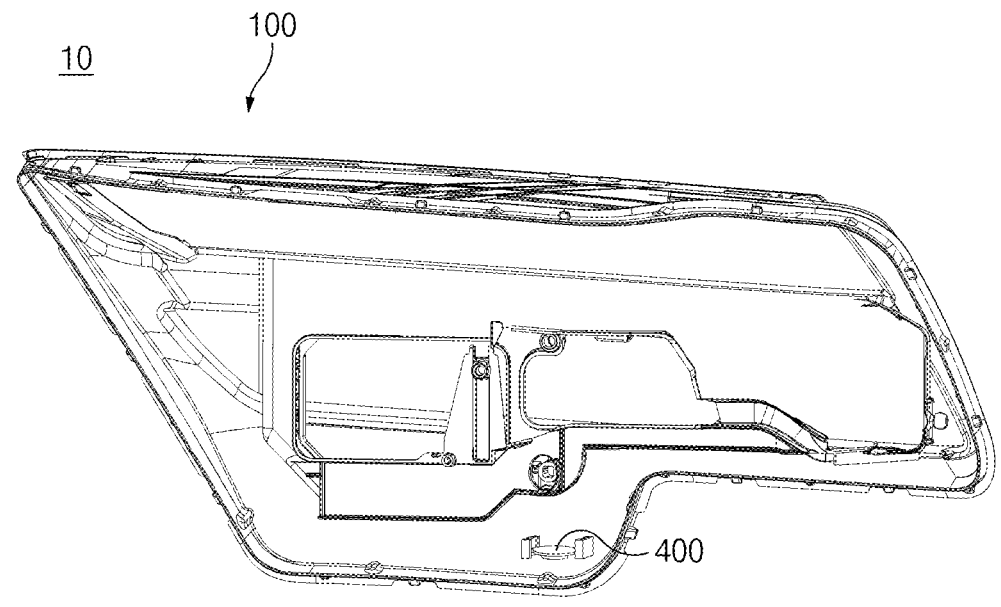
FIG. 3 is a view illustrating a state in which the vibration part is fixed to a lamp housing part in a lamp for a vehicle according to a first embodiment of the present disclosure.
Figure 4:
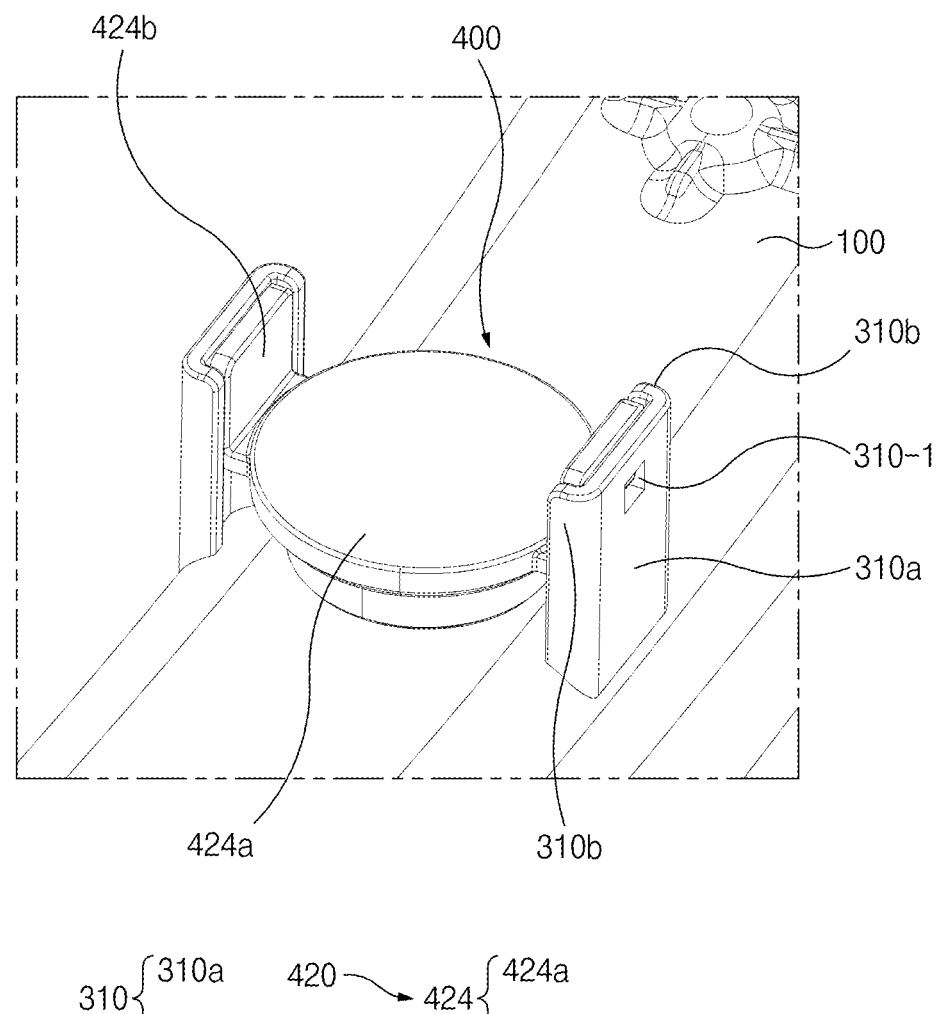
FIG. 4 is an enlarged view of the vibration part in FIG. 3.
Figure 5:
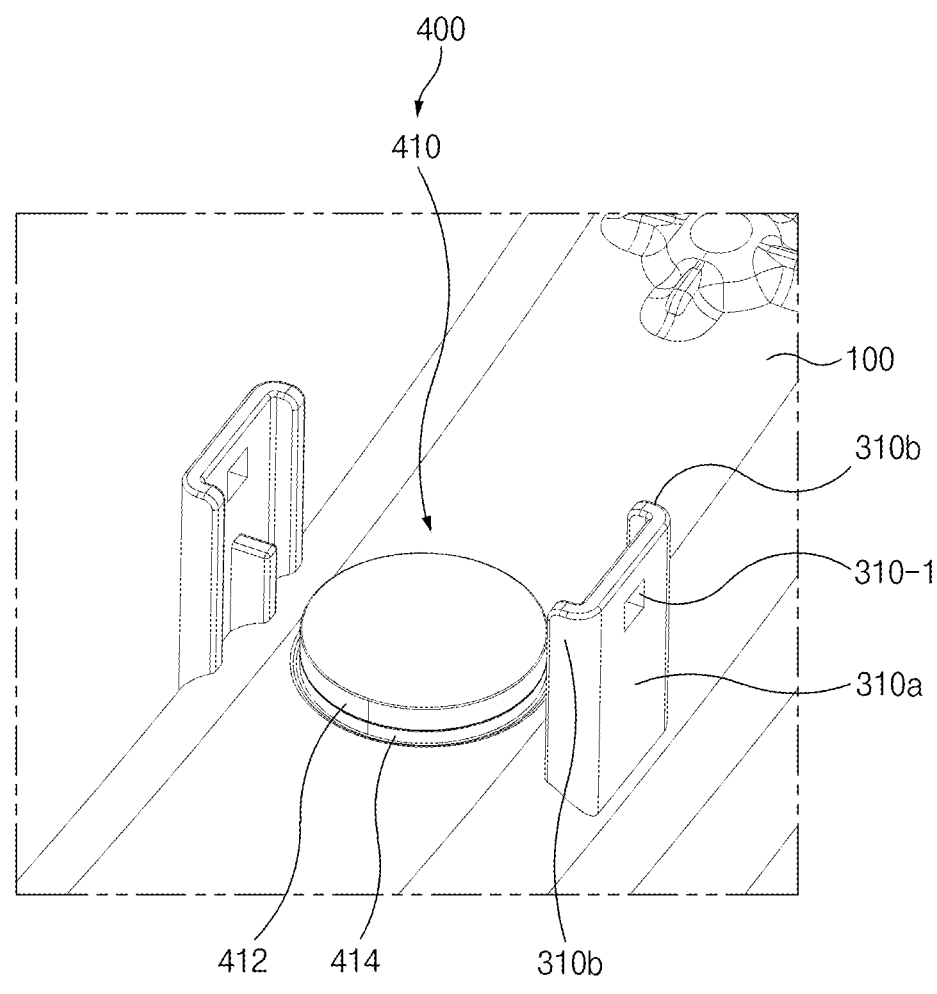
FIG. 5 is an enlarged view illustrating a state in which the second module of the vibration part in FIG. 3 is removed.
Figure 6:
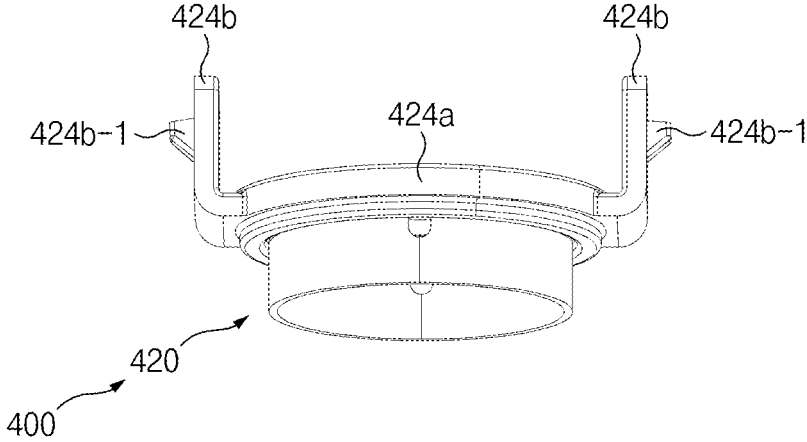
FIG. 6 is an enlarged view of the second module in FIG. 3.
Figure 7:
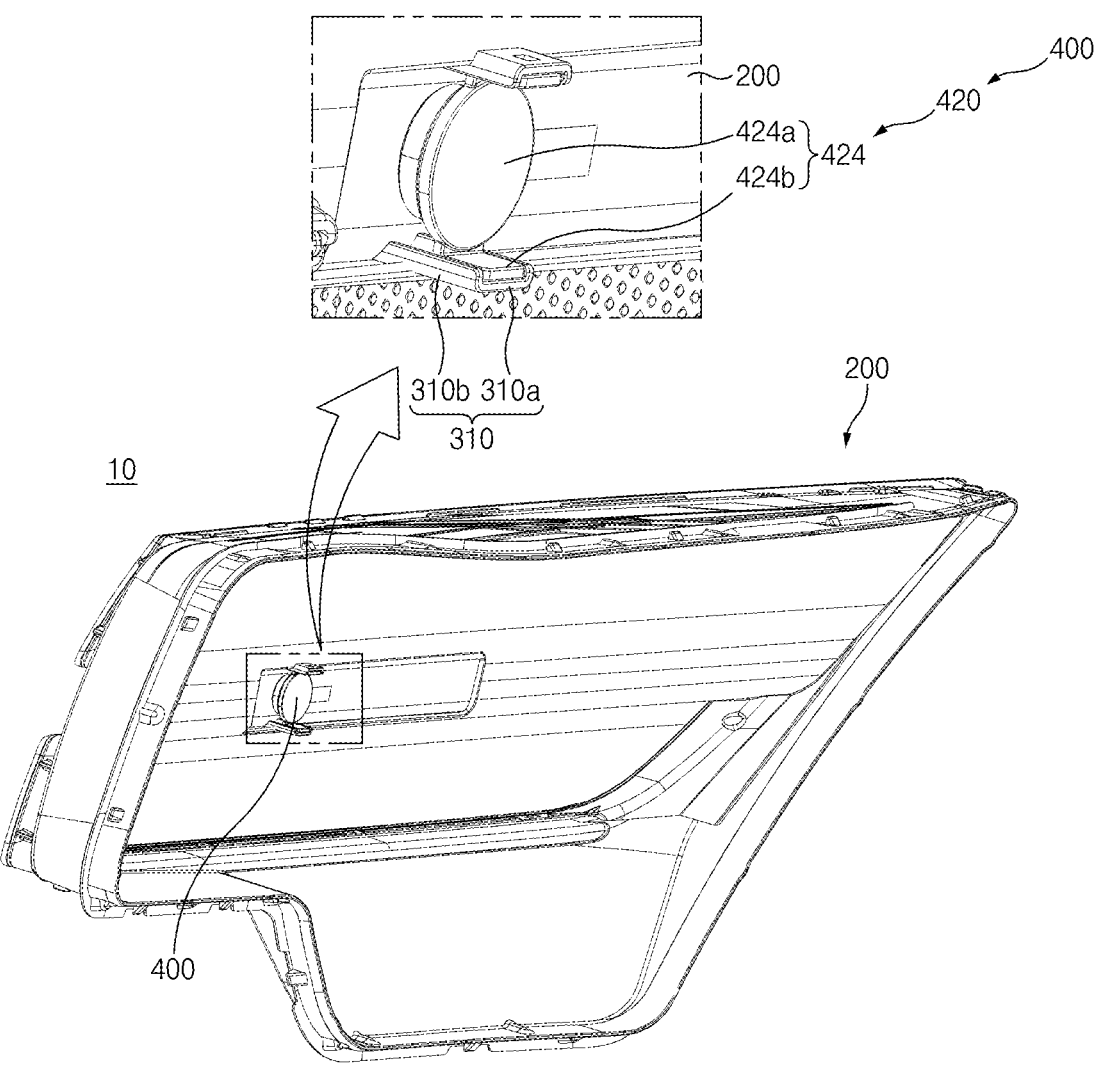
FIG. 7 is a view illustrating a state in which the vibration part is fixed to an outer lens part in the lamp for a vehicle according to the first embodiment of the present disclosure.
Figure 8:
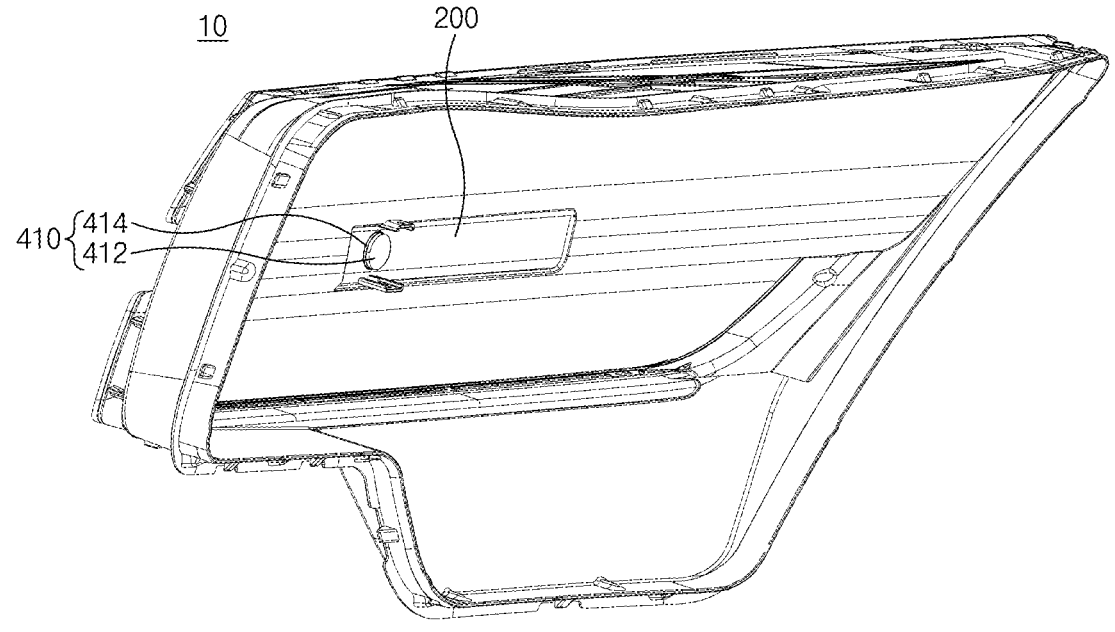
FIG. 8 is an enlarged view illustrating a state in which the second module of the vibration part in FIG. 7 is removed.

FIG. 1 is a view illustrating a cross-sectional structure of a vibration part provided in a lamp for a vehicle according to the present disclosure, and FIG. 2 is a view illustrating a state in which a first module and a second module of the vibration part provided in the lamp for a vehicle according to the present disclosure are spaced apart from each other. FIG. 3 is a view illustrating a state in which the vibration part is fixed to a lamp housing part in a lamp for a vehicle according to a first embodiment of the present disclosure, and FIG. 4 is an enlarged view of the vibration part in FIG. 3. FIG. 5 is an enlarged view illustrating a state in which the second module of the vibration part in FIG. 3 is removed, and FIG. 6 is an enlarged view of the second module in FIG. 3. FIG. 7 is a view illustrating a state in which the vibration part is fixed to an outer lens part in the lamp for a vehicle according to the first embodiment of the present disclosure, and FIG. 8 is an enlarged view illustrating a state in which the second module of the vibration part in FIG. 7 is removed.

With reference to FIGS. 1 to 8, a lamp 10 for a vehicle (hereinafter, referred to as a 'lamp') according to the present disclosure may include a lamp housing part 100 having an internal space configured to accommodate a light source, and an outer lens part 200 coupled to one side of the lamp housing part 100 and configured to cover the internal space. More specifically, the outer lens part 200 may be fixedly coupled to the lamp housing part 100. The light emitted from the light source may propagate to the outside through the outer lens part 200, such that predetermined light distribution patterns and lighting images may be formed.

Meanwhile, according to the present disclosure, the lamp 10 may not only form predetermined light distribution patterns and lighting images, like the lamp in the related art, but also generate a sound. More specifically, the lamp 10 according to the present disclosure may output a sound by vibrating the lamp housing part 100 or the outer lens part 200.

In order to achieve the above-mentioned object, the lamp 10 according to the present disclosure may include a vibration part 400 fixed to the lamp housing part 100 or the outer lens part 200. The vibration part 400 may be configured to output a sound by vibrating the lamp housing part 100 or the outer lens part 200. FIGS. 3 to 6 illustrate states in which the vibration part 400 is fixed to the lamp housing part 100, and FIGS. 7 and 8 illustrate states in which the vibration part 400 is fixed to the outer lens part 200. The vibration part 400 may be accommodated in the internal space formed in the lamp housing part 100.

Meanwhile, with reference to FIGS. 1 and 2, the vibration part 400 may have a structure in which a plurality of modules are coupled. More specifically, the vibration part 400 may include a first module 410, and a second module 420 provided to face the first module 410. With reference to FIGS. 3 to 8, the first module 410 may be fixed to one side of the lamp housing part 100 or the outer lens part 200, and the second module 420 may be fixed to the other side of the lamp housing part 100 or the outer lens part 200. More specifically, as illustrated in FIGS. 3 to 6, in case that the first module 410 is fixed to the lamp housing part 100, the second module 420 may also be fixed to the lamp housing part 100. As illustrated in FIGS. 7 and 8, in case that the first module 410 is fixed to the outer lens part 200, the second module 420 may also be fixed to the outer lens part 200. However, the configuration in which the first module 410 and the second module 420 are fixed to the lamp housing part 100 need not be interpreted as a configuration in which a region of the lamp housing part 100 to which the first module 410 is fixed and a region of the lamp housing part 100 to which the second module 420 is fixed are identical to each other. Rather, according to the present disclosure, the region of the lamp housing part 100 to which the first module 410 is fixed and the region of the lamp housing part 100 to which the second module 420 is fixed may be different from each other, and as described below, the first module 410 and the second module 420 and spaced apart from each other while facing each other.

With reference back to FIGS. 1 and 2, the first module 410 may include a first magnet 412. The first magnet 412 may be a permanent magnet. In addition, the second module 420 may include a second magnet 422 provided to face the first magnet 412. The second magnet 422 may be a permanent magnet. More particularly, the first magnet 412 and the second magnet 422 may be disposed to apply a repulsive force therebetween. Meanwhile, the second module 420 may further include a second magnet fixing portion 424 config-ured to accommodate the second magnet 422, and a coil member 426 provided at one side of the second magnet 422 and accommodated in the second magnet fixing portion 424. For example, as illustrated in FIGS. 1 and 2, the coil member 426 may be provided to surround an outer periphery of the second magnet 422. According to the present disclosure, at ordinary times, a constant interval between the first module 410 and the second module 420 is maintained by the repulsive force between the first magnet 412 and the second magnet 422. In case that an electric current is supplied to the coil member 426, a force applied between the first module 410 and the second module 420 is changed over time by an electromagnetic force, such that the first module 410 vibrates. Therefore, as the lamp housing part 100 or the outer lens part 200, to which the first module 410 is fixed, vibrates, a sound may be outputted from the lamp 10.

Meanwhile, as illustrated in FIGS. 3 to 8, the first module 410 may further include a first magnet fixing portion 414 to which the first magnet 412 is fixed. For example, the first magnet fixing portion 414 may have an approximately circular plate shape. In this case, according to the present disclosure, the first magnet fixing portion 414 may be bonded to the lamp housing part 100 or the outer lens part 200. For example, the first magnet fixing portion 414 may be fixedly coupled to the lamp housing part 100 or the outer lens part 200 by means of a bonding agent or an adhesive tape. Hereinafter, a structure in which the second module 420 of the vibration part 400 is fixed to the lamp housing part 100 or the outer lens part 200 will be described in detail.

Figure 9:
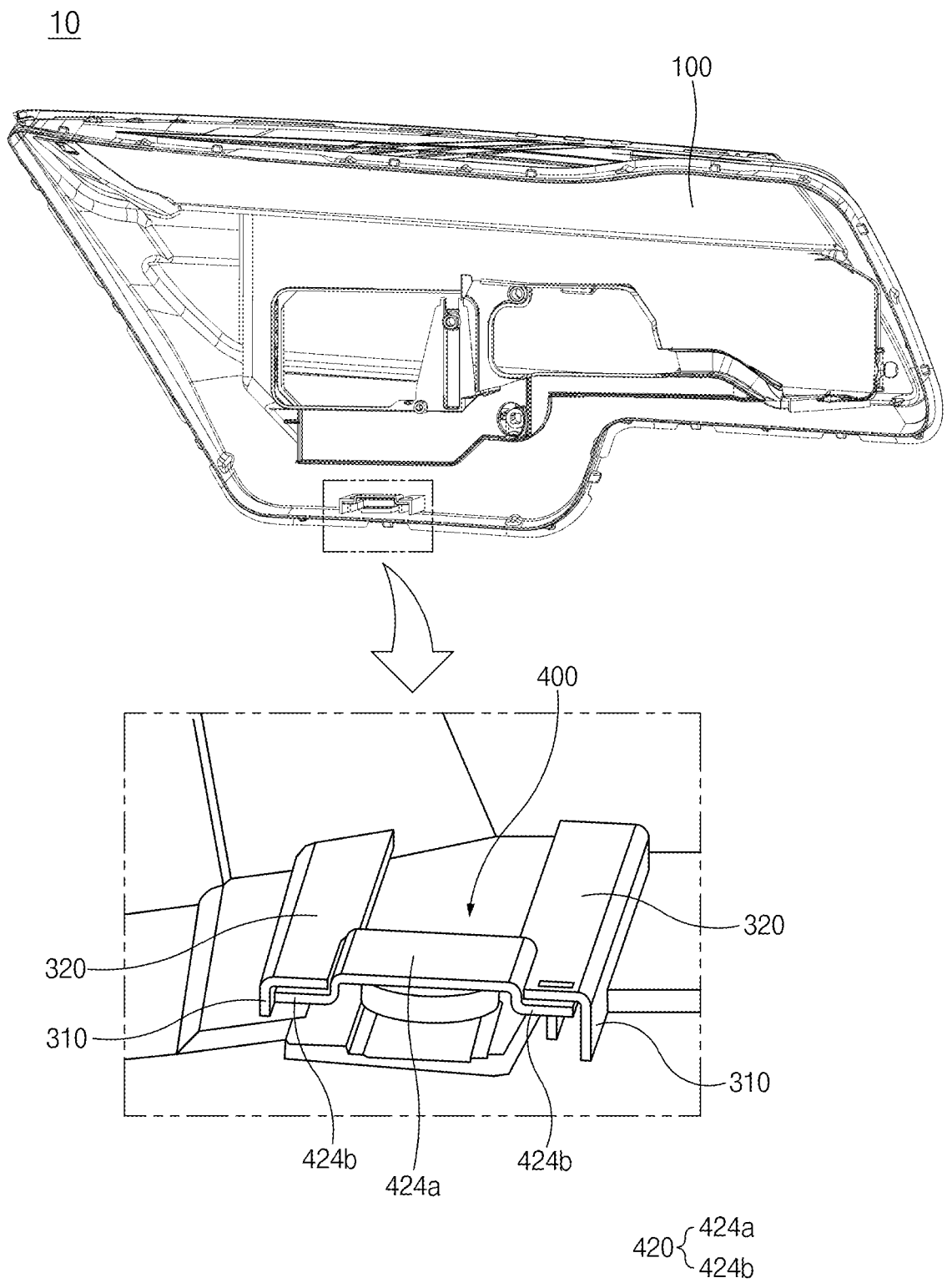
FIG. 9 is a view illustrating a state in which the vibration part is fixed to a lamp housing part of a lamp for a vehicle according to a second embodiment of the present disclosure.
Figure 10:
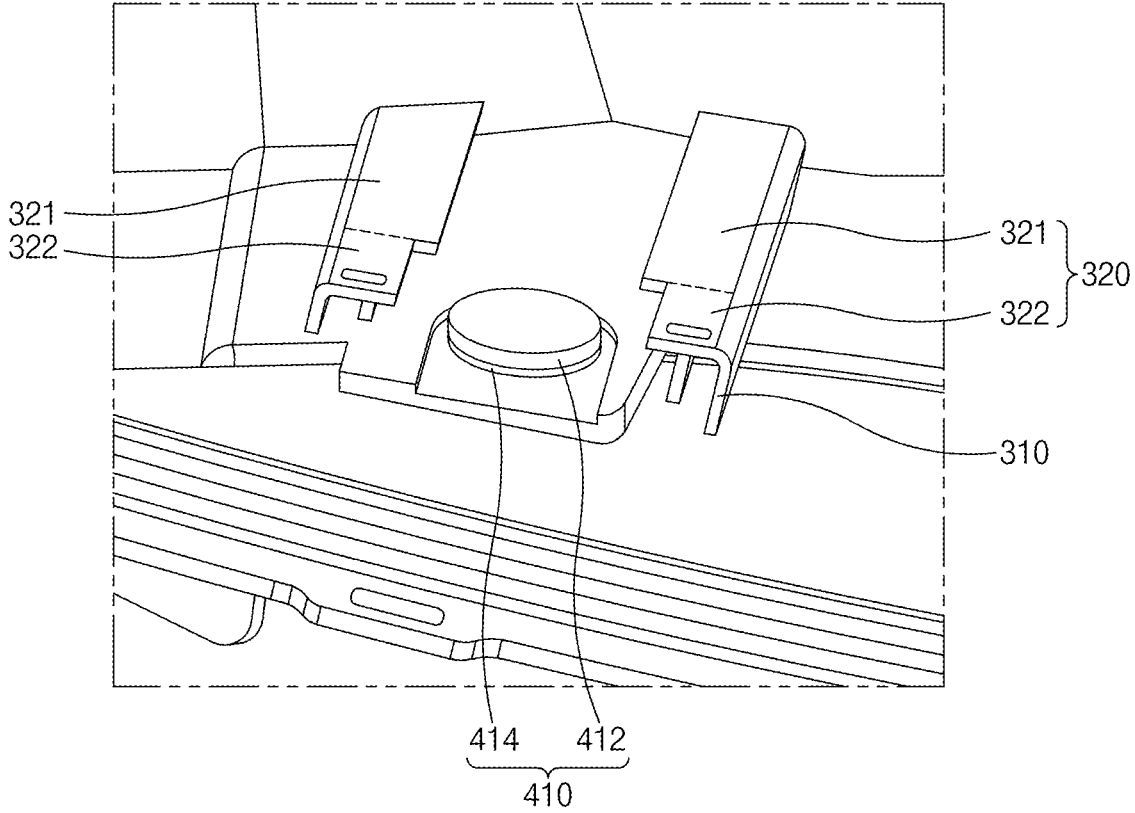
FIG. 10 is an enlarged view illustrating a state in which the second module of the vibration part in FIG. 9 is removed.
Figure 11:
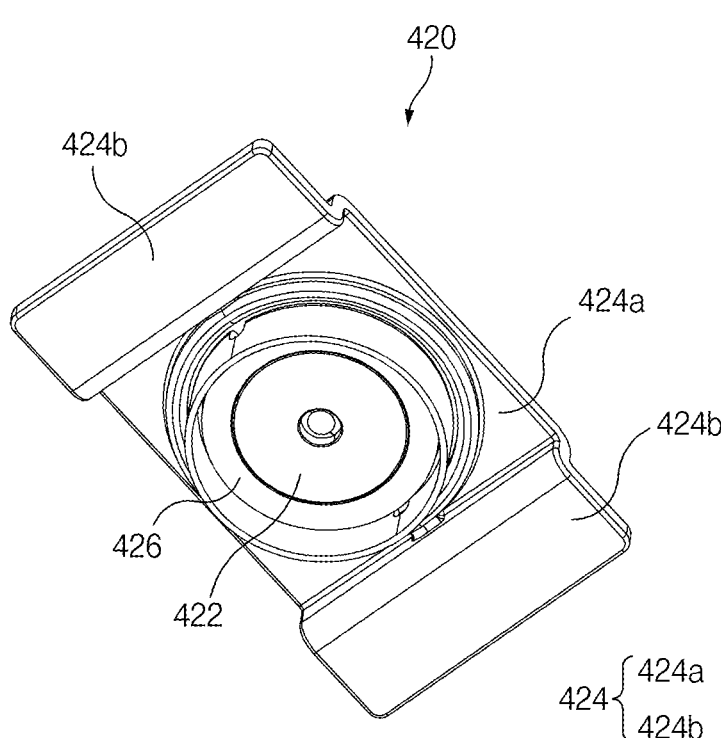
FIG. 11 is an enlarged view of the second module in FIG. 9.
Figure 12:
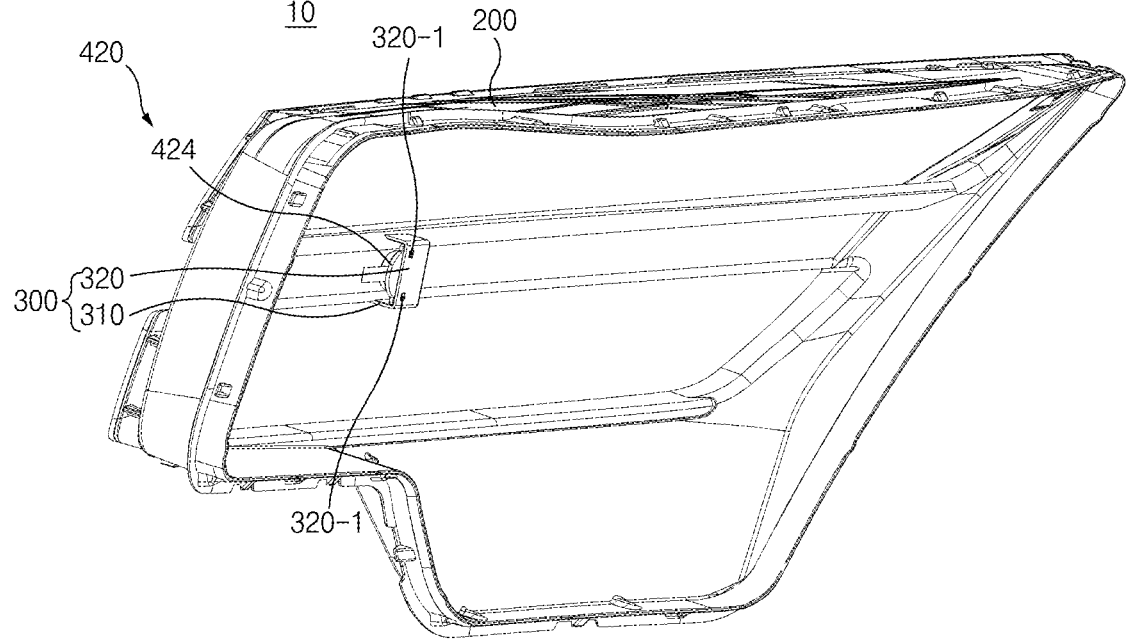
FIG. 12 is a view illustrating a state in which the vibration part is fixed to an outer lens part in the lamp for a vehicle according to the second embodiment of the present disclosure.
Figure 13:
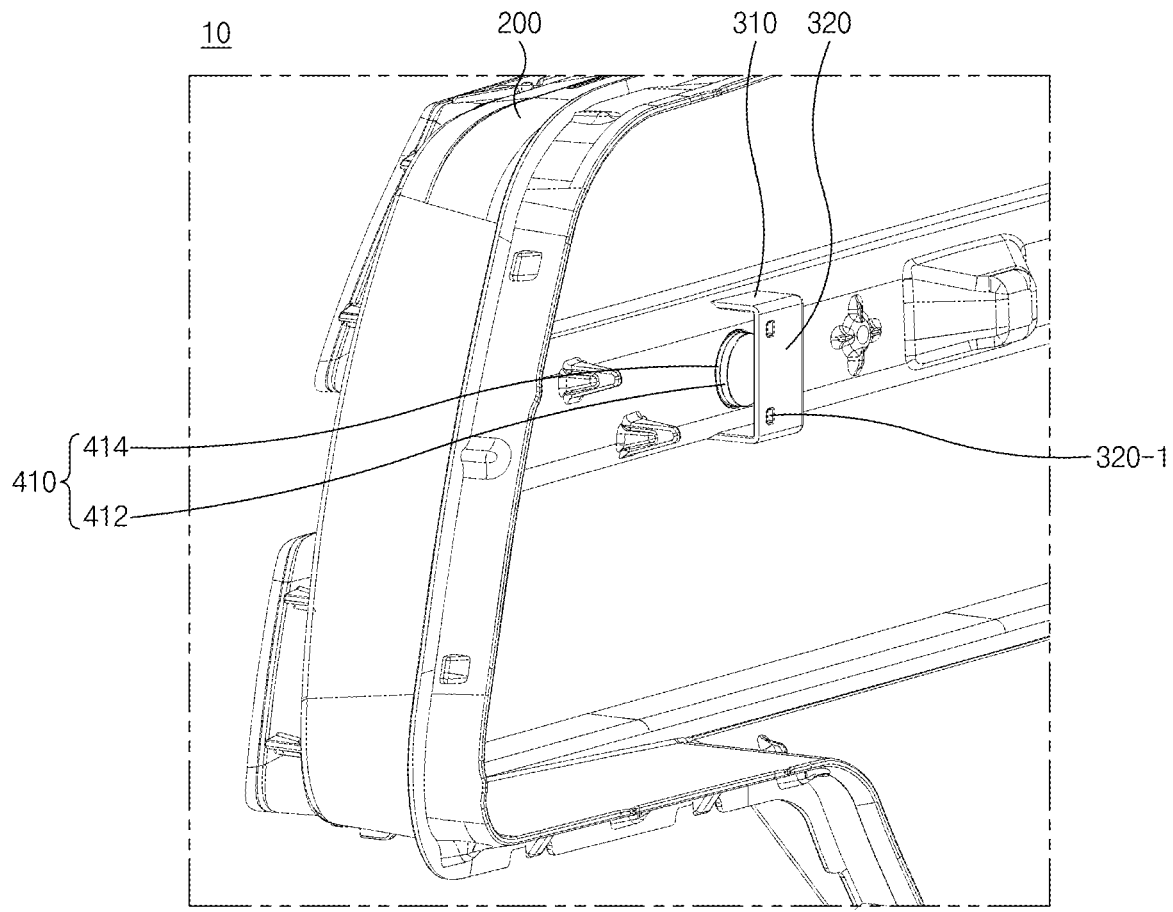
FIG. 13 is an enlarged view illustrating a state in which the second module in FIG. 12 is removed.
Figure 14:
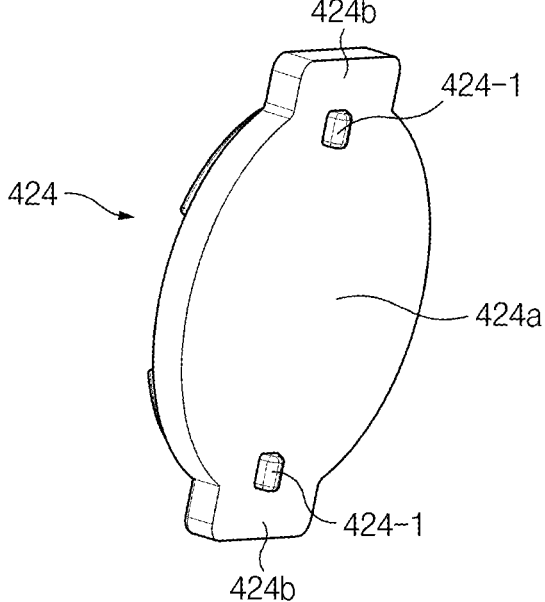
FIG. 14 is an enlarged view of the second module in FIG. 12.

FIG. 8 is an enlarged view illustrating a state in which the second module of the vibration part in FIG. 7 is removed, and FIG. 9 is a view illustrating a state in which the vibration part is fixed to a lamp housing part of a lamp for a vehicle according to a second embodiment of the present disclosure. FIG. 10 is an enlarged view illustrating a state in which the second module of the vibration part in FIG. 9 is removed, and FIG. 11 is an enlarged view of the second module in FIG. 9. FIG. 12 is a view illustrating a state in which the vibration part is fixed to an outer lens part in the lamp for a vehicle according to the second embodiment of the present disclosure, and FIG. 13 is an enlarged view illustrating a state in which the second module in FIG. 12 is removed. FIG. 14 is an enlarged view of the second module in FIG. 12.

With reference to FIGS. 3 to 14, the lamp housing part 100 or the outer lens part 200 may include two first pro-truding sections 310 protruding from an inner surface of the lamp housing part 100 or the outer lens part 200 and spaced apart from each other. FIGS. 3 to 5 illustrate states in which the two first protruding sections 310 protrude from the inner surface of the lamp housing part 100, and FIGS. 7 and 8 illustrate states in which the two first protruding sections 310 protrude from the inner surface of the outer lens part 200.

Meanwhile, the second magnet fixing portion 424 of the second module 420 may include a frame body region 424a having a space configured to accommodate the second magnet 422 (see FIGS. 1 and 2) and the coil member 426 (see FIGS. 1 and 2), and two frame extension regions 424b extending from two opposite sides of the frame body region 424a. For example, the frame body region 424a may have a plate shape. FIGS. 4, 6, 7, and 8 illustrate states in which the two frame extension regions 424b extend after being bent from an outer peripheral surface of the frame body region 424a in a direction perpendicular to a direction in which the frame body region 424a extends. FIGS. 9 to 14 illustrate states in which the two frame extension regions 424b extend in a direction parallel to the direction in which the frame body region 424a extends. However, FIGS. 9 to 11 illustrate states in which the frame extension region 424b extends while defining a stepped portion together with the frame body region 424a. FIGS. 12 to 14 illustrate states in which the frame extension region 424b extends on the same plane as the frame extension region 424b.

In this case, according to the first embodiment of the present disclosure, the two frame extension regions 424b may be inserted between the two first protruding sections 310. A shortest distance between the two first protruding sections 310 may be shorter than a shortest distance between the two frame extension regions 424b.

More specifically, as illustrated in FIGS. 3 to 8, according to one aspect of the first embodiment of the present disclo-sure, the two frame extension regions 424b may extend in parallel with the direction in which the first protruding section 310 protrudes from the inner surface of the lamp housing part 100 or the outer lens part 200. FIGS. 3 to 6 illustrate states in which the first protruding sections 310 protrude from the inner surface of the lamp housing part 100, and the two frame extension regions 424b are parallel to the direction in which the first protruding sections 310 protrude. FIGS. 7 and 8 illustrate states in which the first protruding sections 310 protrude from the inner surface of the outer lens part 200, and the two frame extension regions 424b are parallel to the direction in which the first protruding sections 310 protrude.

Meanwhile, with reference to FIGS. 3 to 8, according to one aspect of the first embodiment of the present disclosure, the first protruding sections 310 may include a first-first protruding section 310a protruding from the inner surface of the lamp housing part 100 or the outer lens part 200, and first-second protruding sections 310b extending from two opposite sides of the first-first protruding section 310a in a direction in which the first-second protruding sections 310b surround the frame extension region 424b. In this case, the first protruding section 310 including the first-first protrud-ing section 310a and the first-second protruding sections 310b may have an approximately U-shaped cross-sectional structure. The frame extension region 424b may be sur-rounded by the first-first protruding section 310a and the first-second protruding sections 310b. FIGS. 3 to 6 illustrate the first protruding section 310 including the first-first pro-truding section 310a and the first-second protruding sections 310b in case that the first protruding section 310 protrudes from the lamp housing part 100. FIGS. 7 and 8 illustrate the first protruding section 310 including the first-first protruding section 310_a_ and the first-second protruding sections 310_b_ in case that the first protruding section 310 protrudes from the outer lens part 200.

With continued reference to FIGS. 3 to 8, according to one aspect of the first embodiment of the present disclosure, the frame extension region 424_b_ and the first protruding section 310 may be provided to be in contact with each other. In this case, the frame extension region 424_b_ and the first protruding section 310 may be configured to engage with each other. Therefore, the second magnet fixing portion 424 and the first protruding section 310 may be prevented from being uncoupled.

More specifically, a first concave-convex portion 424_b_-1 having a concave-convex shape may be formed in a region of the frame extension region 424_b_ that faces the first protruding section 310, and a second concave-convex portion 310-1, which engages with the first concave-convex portion 424_b_-1, may be formed in a region of the first protruding section 310 that corresponds to the first concave-convex portion 424_b_-1. That is, the first concave-convex portion 424_b_-1 and the second concave-convex portion 310-1 may be provided to engage with each other. For example, with reference to FIGS. 3 to 8, the first concave-convex portion 424_b_-1 may have a shape protruding outward from the frame extension region 424_b_, and the second concave-convex portion 310-1 may have a hole shape formed through the first protruding section 310. However, instead of the hole shape, the second concave-convex portion 310-1 may have a shape recessed from an outer surface of the first protruding section 310. FIGS. 3 to 6 illustrate states in which the second concave-convex portion 310-1 is formed in the first protruding section 310 protruding from the lamp housing part 100. FIGS. 7 and 8 illustrate states in which the second concave-convex portion 310-1 is formed in the first protruding section 310 protruding from the outer lens part 200.

With reference to the above-mentioned description, according to one aspect of the first embodiment of the present disclosure, the second module 420 may be fixedly coupled to the lamp housing part 100 or the outer lens part 200 by moving in a direction toward the first module 410. In particular, according to one aspect of the first embodiment of the present disclosure, the first concave-convex portion 424_b_-1 and the second concave-convex portion 310-1 may engage with each other while the second module 420 moves in the direction toward the first module 410, such that the second module 420 may be fixedly coupled to the lamp housing part 100 or the outer lens part 200.

In contrast, as illustrated in FIGS. 9 to 14, according to another aspect of the first embodiment of the present disclosure, the lamp housing part 100 or the outer lens part 200 may further include second protruding sections in addition to the first protruding sections 310. The description of the first protruding section 310 may be replaced with the above-mentioned description of one aspect of the first embodiment of the present disclosure.

More specifically, according to another aspect of the first embodiment of the present disclosure, the lamp housing part 100 or the outer lens part 200 may further include second protruding sections 320 bent inward from the two first protruding sections 310. More specifically, the second protruding section 320 may be bent from an end of the first protruding section 310 based on a direction away from the lamp housing part 100 or the outer lens part 200. FIGS. 9 to 11 illustrate states in which the first protruding section 310 and the second protruding section 320 protrude from the lamp housing part 100. FIGS. 12 to 14 illustrate states in which the first protruding section 310 and the second protruding section 320 protrude from the outer lens part 200.

In this case, according to another aspect of the first embodiment of the present disclosure, the two frame extension regions 424_b_ may extend in the direction away from the two opposite sides of the frame body region 424_a_ and extend in a direction parallel to a direction in which the second protruding sections 320 extend. In addition, the two frame extension regions 424_b_ and the frame body region 424_a_ may be accommodated in a space defined by the first protruding sections 310 and the second protruding sections 320.

Meanwhile, as illustrated in FIGS. 9 to 11, according to another aspect of the first embodiment of the present disclosure, in case that the first protruding sections 310 and the second protruding sections 320 are provided on the lamp housing part 100, the two first protruding sections 310 may protrude from a lower region of the inner surface of the lamp housing part 100 that extends in a direction (e.g., a horizontal direction) intersecting an upward/downward direction, and the second protruding sections 320 may be provided as two second protruding sections 320 respectively bent from the two first protruding sections 310 and spaced apart from each other.

With continued reference to FIGS. 9 to 11, in case that the first protruding sections 310 and the second protruding sections 320 are provided on the lamp housing part 100, the two second protruding sections 320 may each include a second-first protruding section 321 having a first length that is a length by which the second-first protruding section 321 is bent and extends from the first protruding section 310, and a second-second protruding section 322 connected to the second-first protruding section and having a second length that is a length by which the second-second protruding section 322 is bent and extends from the first protruding section 310, and the second length may be shorter than the first length. In this case, a stepped section may be formed in a region of the second protruding section 320 in which the second-first protruding section 321 and the second-second protruding section 322 meet together. In this case, the frame body region 424_a_ may be provided in a space between the two second-second protruding sections 322. More specifically, the frame body region 424_a_ may be provided to face the stepped section, which connects the second-first protruding section 321 and the second-second protruding section 322, while being in contact with the stepped section. Meanwhile, at least a part of the frame extension region 424_b_ may be provided in a space between the second-first protruding section 321 and the inner surface of the lamp housing part 100.

According to the configuration described above with reference to FIGS. 9 to 11, the second module 420 may be fixedly coupled to the lamp housing part 100 by moving in the direction intersecting the direction in which the first protruding sections 310 protrude from the lamp housing part 100. That is, the second module 420 may move, in the direction intersecting the direction in which the first protruding sections 310 protrude, until the frame body region 424_a_ interferes with the stepped sections. Therefore, the frame body region 424_a_ may be accommodated in the space defined by the two second-second protruding sections 322.

Meanwhile, with reference to FIGS. 12 to 14, in case that the first protruding sections 310 and the second protruding sections 320 are provided on the outer lens part 200, the two first protruding sections 310 may protrude from a region of the inner surface of the outer lens part 200 that extends in the direction (e.g., the upward/downward direction) intersecting the horizontal direction. Unlike the configuration illustrated in FIGS. 9 to 11, the second protruding section 320 may be configured as a single component instead of two components. More specifically, the second protruding section 320 may be bent from the two first protruding sections 310 and connect the two first protruding sections 310. It may be understood that the first protruding sections 310 and the second protruding section 320 define an approximately U shape as a whole. In addition, in this case, the second magnet fixing portion 424 may be inserted into a space defined by the two first protruding sections 310 and the second protruding section 320. Meanwhile, for example, FIGS. 12 to 14 illustrate states in which the two first protruding sections 310 are spaced apart from each other in the upward/downward direction. This may be to prevent the second magnet fixing portion 424 from being dropped by gravity.

More specifically, as illustrated in FIGS. 12 to 14, the second magnet fixing portion 424 and the second protruding section 320 may be provided to be in contact with each other. First concave-convex portions 424-1 each having a concave-convex shape may be formed in a region of the second magnet fixing portion 424 that faces the second protruding section 320. Second concave-convex portions 320-1, which are configured to engage with the first concave-convex portions 424-1, may be formed in a region of the second protruding section 320 that corresponds to the first concave-convex portions 424-1. That is, the first concave-convex portion 424-1 and the second concave-convex portion 320-1 may be provided to engage with each other. For example, with reference to FIGS. 12 to 14, the first concave-convex portion 424-1 may have a shape protruding from the second magnet fixing portion 424 toward the second protruding section 320, and the second concave-convex portion 320-1 may have a hole shape formed through the second protruding section 320. However, instead of the hole shape, the second concave-convex portion 320-1 may have a shape recessed from an outer surface of the second protruding section 320.

Figure 15:
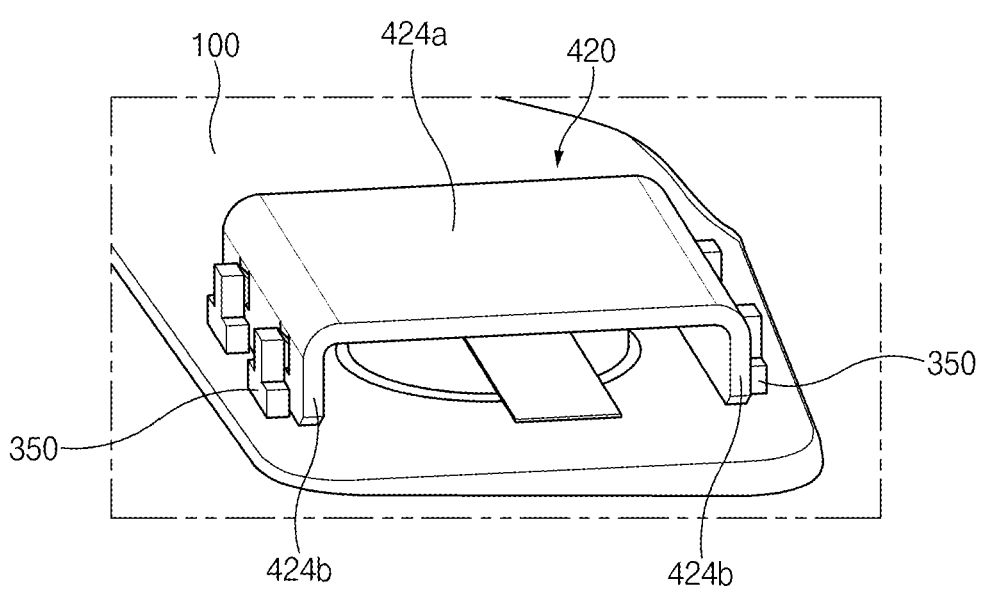
FIG. 15 is a view illustrating a state in which the vibration part is fixed to a lamp housing part of a lamp for a vehicle according to a third embodiment of the present disclosure.
Figure 16:
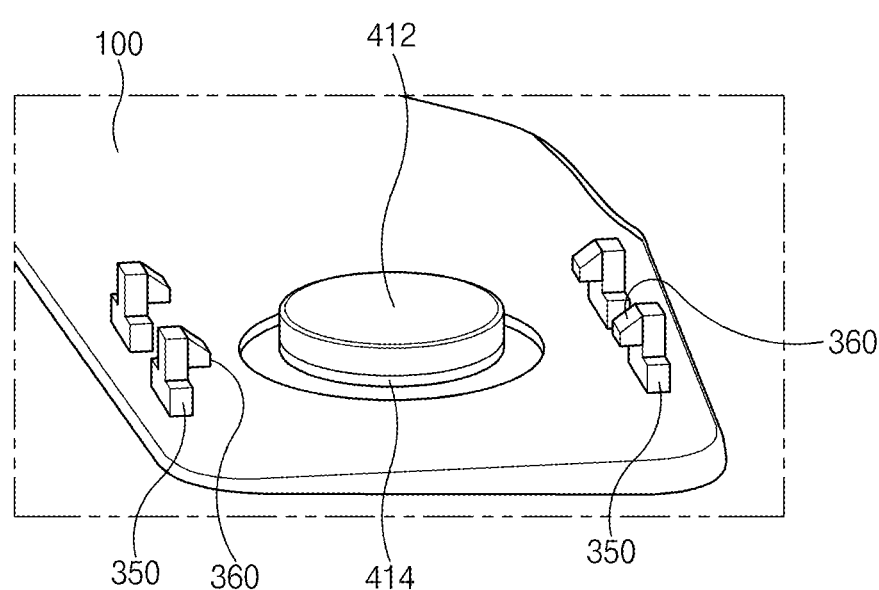
FIG. 16 is a view illustrating a state in which the second module of the vibration part in FIG. 15 is removed.
Figure 17:
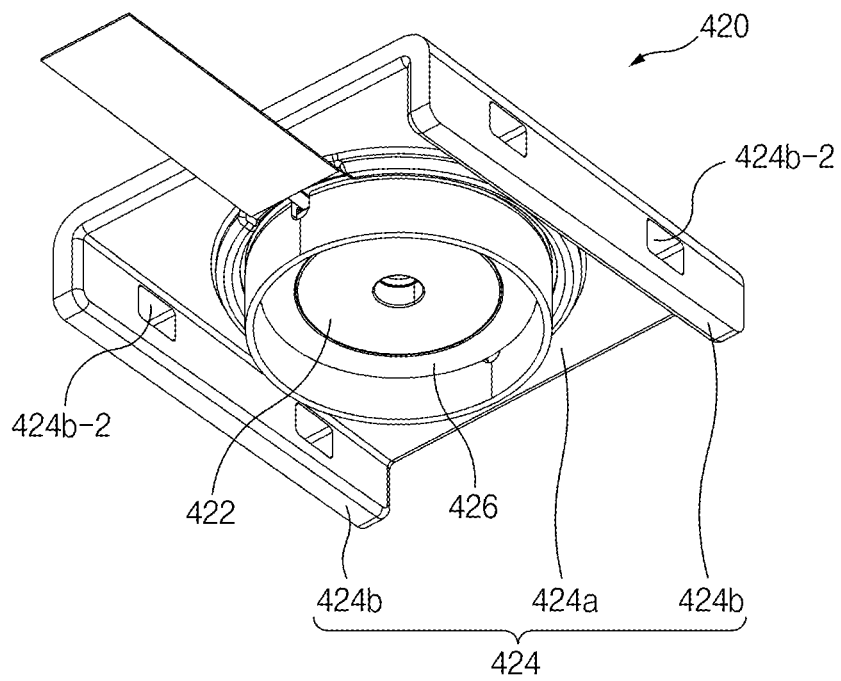
FIG. 17 is an enlarged view of the second module in FIG. 15.
Figure 18:
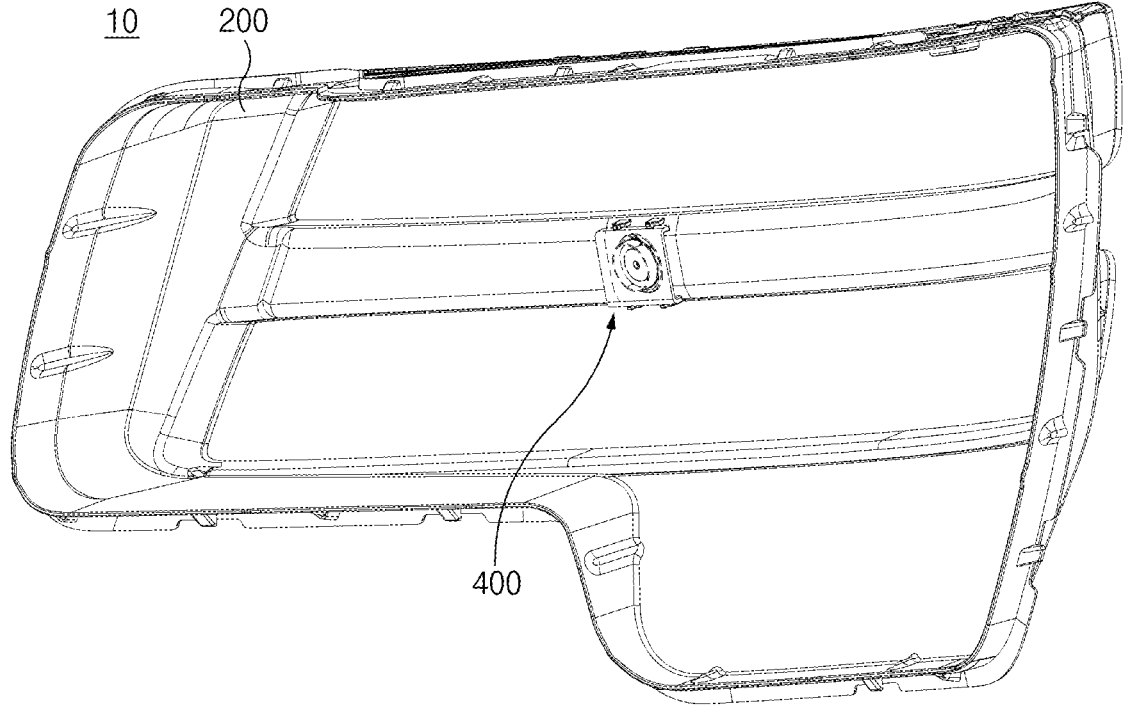
FIG. 18 is a view illustrating a state in which the vibration part is fixed to an outer lens part in the lamp for a vehicle according to the third embodiment of the present disclosure.
Figure 19:
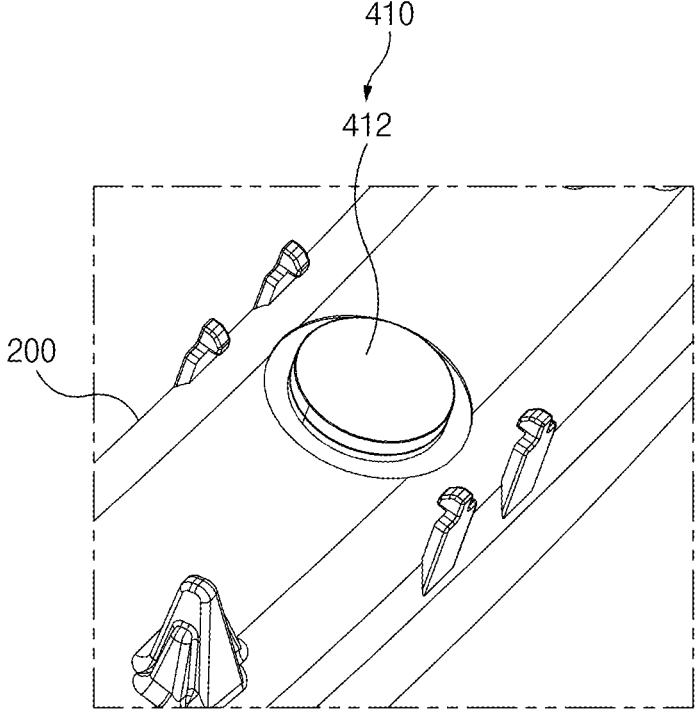
FIG. 19 is an enlarged view illustrating a state in which the second module of the vibration part in FIG. 18 is removed.

FIG. 15 is a view illustrating a state in which the vibration part is fixed to a lamp housing part of a lamp for a vehicle according to a third embodiment of the present disclosure, and FIG. 16 is a view illustrating a state in which the second module of the vibration part in FIG. 15 is removed. FIG. 17 is an enlarged view of the second module in FIG. 15, and FIG. 18 is a view illustrating a state in which the vibration part is fixed to an outer lens part in the lamp for a vehicle according to the third embodiment of the present disclosure. FIG. 19 is an enlarged view illustrating a state in which the second module of the vibration part in FIG. 18 is removed, and FIG. 20 is an enlarged view of the second module in FIG. 18.

According to the third embodiment of the present disclosure, the vibration part 400 may be coupled to the lamp housing part 100 or the outer lens part 200 by a hook engagement. Meanwhile, the description of the third embodiment of the present disclosure may be replaced with the above-mentioned description of the first embodiment of the present disclosure, except for the following description.

Figure 20:
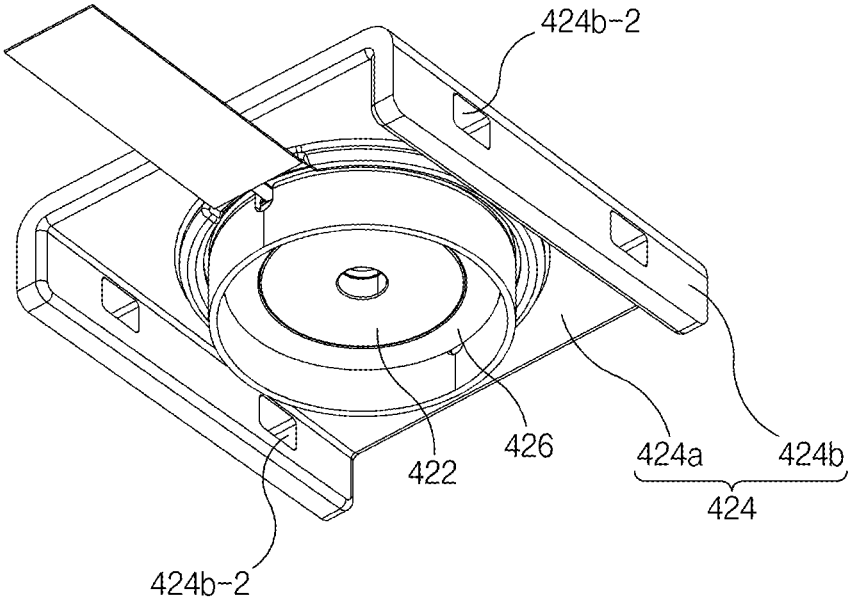
FIG. 20 is an enlarged view of the second module in FIG. 18.

With reference to FIGS. 15 to 20, in the lamp 10 according to the third embodiment of the present disclosure, the lamp housing part 100 or the outer lens part 200 may include two protruding sections 350 protruding from the inner surface of the lamp housing part 100 or the outer lens part 200 and spaced apart from each other. The two protruding sections 350 may correspond to the first protruding sections 310 in FIGS. 3 to 8. FIGS. 15 to 17 illustrate states in which the two protruding sections 350 protrude from the inner surface of the lamp housing part 100. FIGS. 18 to 20 illustrate states in which the two protruding sections 350 protrude from the inner surface of the outer lens part 200. In addition, the lamp 10 according to the third embodiment of the present disclosure may further include hook sections 360 bent from the two protruding sections 350.

Meanwhile, the lamp 10 according to the third embodiment of the present disclosure may further include the hook sections 360 bent from the two protruding sections 350. The hook section 360 may be coupled to the second magnet fixing portion 424 by a hook engagement.

In addition, with reference to FIGS. 15 to 20, the second magnet fixing portion 424 of the second module 420 of the vibration part 400 may include the frame body region 424*a* configured to accommodate the second magnet 422 and the coil member 426, and the two frame extension regions 424*b* bent and extending from the two opposite sides of the frame body region 424*a*. In this case, according to the third embodiment of the present disclosure, hook holes 424*b*-2 having shapes corresponding to the hook sections 360 may be formed in the two frame extension regions 424*b*, and the hook sections 360 may be inserted into the hook holes 424*b*-2.

Meanwhile, with reference to FIGS. 15 to 17, in case that the protruding sections 350 protrude from the inner surface of the lamp housing part 100, the two protruding sections 350 may protrude from the lower region of the inner surface of the lamp housing part 100 that extends in the direction (e.g., the horizontal direction) intersecting the upward/downward direction.

In contrast, with reference to FIGS. 18 to 20, in case that the protruding sections 350 protrude from the inner surface of the outer lens part 200, the two protruding sections 350 may protrude from the region of the inner surface of the outer lens part 200 that extends in a direction intersecting the direction (e.g., the upward/downward direction) intersecting the horizontal direction.

Figure 21:
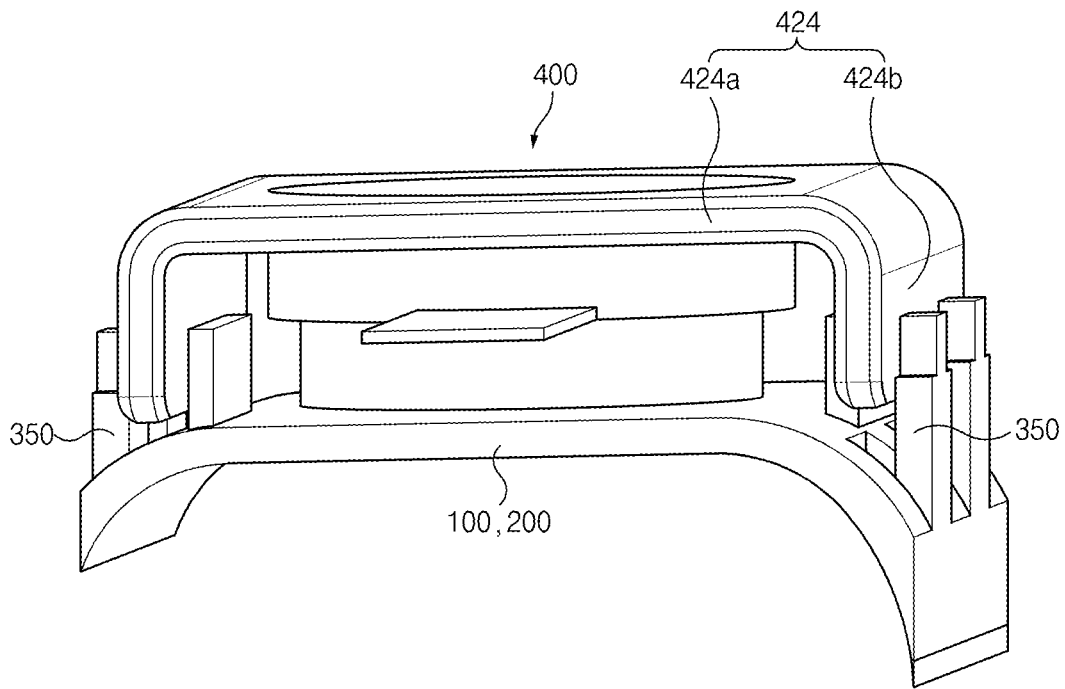
FIG. 21 is a view illustrating another example of the vibration part provided in the lamp for a vehicle according to the third embodiment of the present disclosure.
Figure 22:
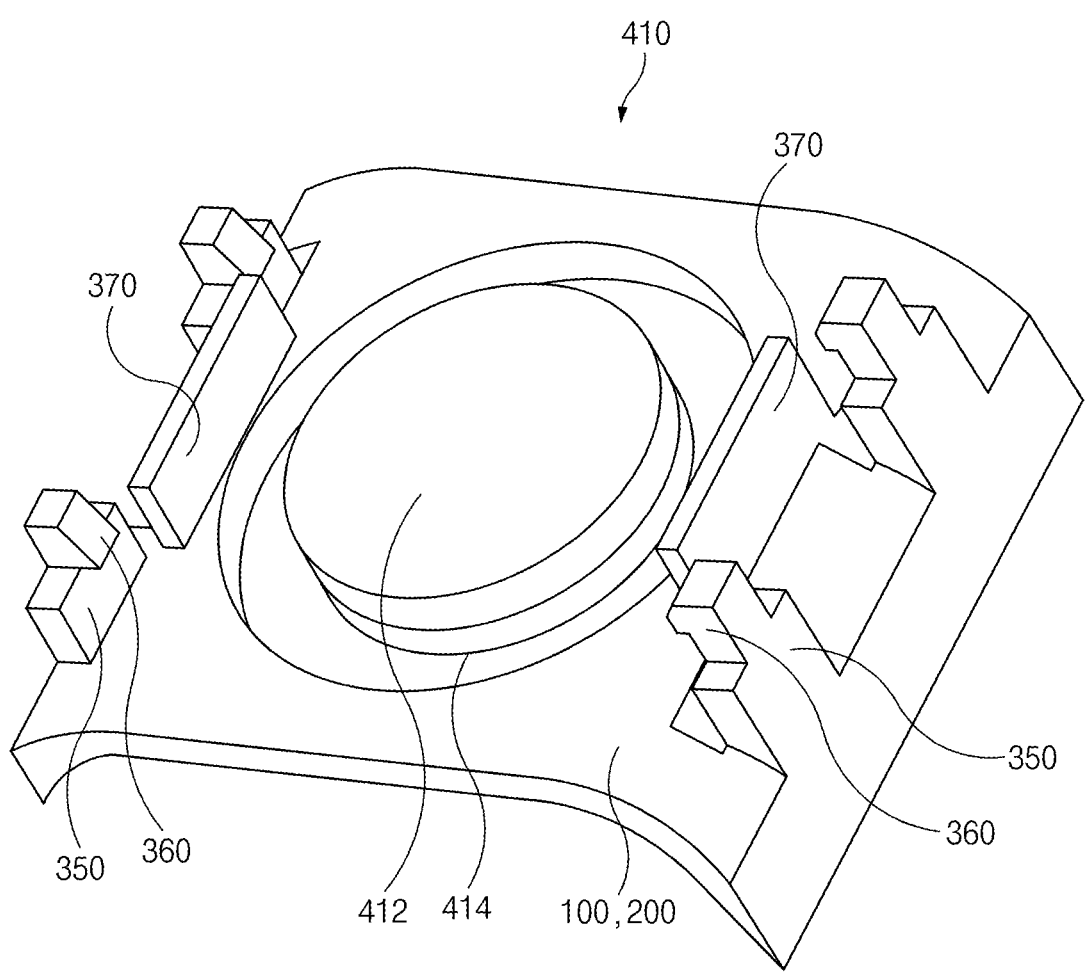
FIG. 22 is a view illustrating the first module in FIG. 21.

FIG. 21 is a view illustrating another example of the vibration part provided in the lamp for a vehicle according to the third embodiment of the present disclosure. FIG. 22 is a view illustrating the first module in FIG. 21, and FIG. 23 is a view illustrating the second module in FIG. 21.

Figure 23:
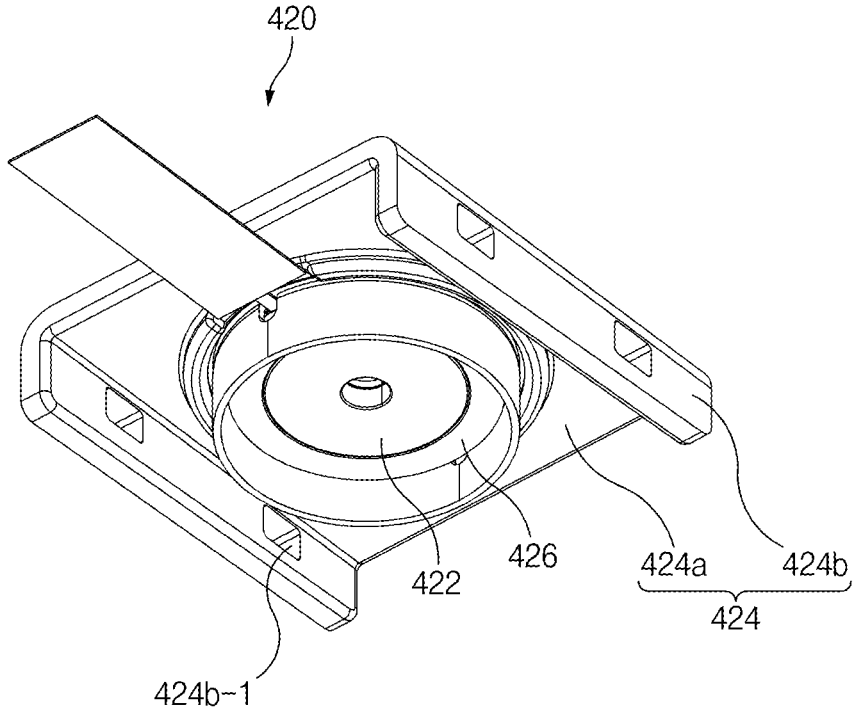
FIG. 23 is a view illustrating the second module in FIG. 21.

The vibration part 400 illustrated in FIGS. 21 to 23 is similar to the vibration part described above with reference to FIGS. 15 to 20 in that the vibration part is coupled to the lamp housing part or the outer lens part by a hook engagement. However, the lamp housing part 100 or the outer lens part 200 according to another example of the third embodiment of the present disclosure may further include two extension sections 370 protruding from the inner surface of the lamp housing part 100 or the outer lens part 200 and disposed between the two protruding sections 350. In this case, based on the state in which the hook sections 360 are inserted into the hook holes 424*b*-2 of the second module 420, the two frame extension regions 424*b* may be interposed between the protruding sections 350 and the extension sections 370. More particularly, the frame extension region 424*b* may be in contact with the extension section 370. In this case, the extension section 370 may have a structure that presses the frame extension region 424*b* in a direction toward the protruding section 350. Therefore, it is possible to more effectively prevent the hook engagement between the hook section 360 and the hook hole 424*b*-2 from being released.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lamp for a vehicle, the lamp comprising:
a lamp housing part configured to accommodate a light source in an internal lamp housing part space defined therein;
an outer lens part coupled to one side of the lamp housing part and configured to cover the internal lamp housing part space; and
a vibration part fixed to the lamp housing part,
wherein the vibration part comprises:
a first module fixed to a first side of the lamp housing part; and
a second module fixed to a second side of the lamp housing part and configured to face the first module,
wherein the first module comprises a first magnet, and
wherein the second module comprises:
a second magnet configured to face the first magnet;
a second magnet fixing portion configured to accommodate the second magnet; and
a coil member provided at one side of the second magnet and accommodated in the second magnet fixing portion.

2. The lamp of claim 1, wherein the first module further comprises a first magnet fixing portion to which the first magnet is fixed, and
wherein the first magnet fixing portion is bonded to the lamp housing part.

3. The lamp of claim 1, wherein the coil member is configured to surround an outer periphery of the second magnet.

4. The lamp of claim 1, wherein the lamp housing part comprises two first protruding sections protruding from an inner surface of the lamp housing part and spaced apart from each other, wherein the second magnet fixing portion comprises:
a frame body region configured to accommodate the second magnet and the coil member in a frame body region internal space defined therein; and
two frame extension regions being configured to extend from opposite sides of the frame body region, and
wherein the two frame extension regions are inserted between the two first protruding sections.

5. The lamp of claim 4, wherein the two frame extension regions are configured to extend in parallel with a first direction in which the two first protruding sections respectively protrude from the inner surface of the lamp housing part.

6. The lamp of claim 5, wherein the two first protruding sections each comprise:
a first-first protruding section configured to protrude from the inner surface of the lamp housing part; and
first-second protruding sections configured to extend from opposite sides of the first-first protruding section in a second direction in which the first-second protruding sections surround a respective frame extension region of the two frame extension regions.

7. The lamp of claim 5, wherein a respective frame extension region and a first protruding section of the two frame extension regions and the two first protruding sections are configured to be in contact with each other,
wherein a first concave-convex portion having a concave-convex shape is formed in a region of the frame extension region that faces the first protruding section, and
wherein a second concave-convex portion, which is configured to engage with the first concave-convex portion, is formed in a region of the first protruding section that corresponds to the first concave-convex portion.

8. The lamp of claim 4, wherein the lamp housing part further comprises second protruding sections bent from the first protruding sections,
wherein the two frame extension regions extend in a third direction away from the opposite sides of the frame body region and extend in parallel with a fourth direction in which the second protruding sections extend, and
wherein the two frame extension regions and the frame body region are accommodated in a first space defined by the first protruding sections and the second protruding sections.

9. The lamp of claim 8, wherein the two first protruding sections are configured to protrude from a lower region of the inner surface of the lamp housing part that extends in a fifth direction intersecting an upward/downward direction, and
wherein the second protruding sections include two second protruding sections respectively bent from the two first protruding sections and spaced apart from each other.

10. The lamp of claim 9, wherein the two second protruding sections each comprise:
a second-first protruding section having a first length defined by a distance in which the second-first protruding section being bent and extending from the first protruding section; and
a second-second protruding section connected to the second-first protruding section and having a second length defined by the second-second protruding section being bent and extending from the first protruding section, wherein the second length is shorter than the first length, and wherein the frame body region is provided in a second space defined between the second-second protruding sections of the respective two second protruding sections.

11. The lamp of claim 10, wherein the frame body region is configured to face a stepped section, the stepped section being configured to connect the second-first protruding section and the second-second protruding section.

12. The lamp of claim 1, wherein the lamp housing part comprises:

two protruding sections configured to protrude from an inner surface of the lamp housing part and spaced apart from each other; and hook sections bent from the two protruding sections, wherein the second magnet fixing portion comprises:

a frame body region configured to accommodate the second magnet and the coil member; and two frame extension regions bent and extending from two opposite sides of the frame body region, wherein hook holes having shapes corresponding to the hook sections are respectively formed in the two frame extension regions, and wherein the hook sections are inserted into the hook holes.

13. The lamp of claim 12, wherein the two protruding sections protrude from a lower region of the inner surface of the lamp housing part that extends in a sixth direction intersecting an upward/downward direction.

14. The lamp of claim 12, wherein the two protruding sections protrude from a region of the inner surface of the outer lens part that extends in a seventh direction intersecting a horizontal direction.

15. The lamp of claim 12, wherein the lamp housing part further comprises two extension sections protruding from the inner surface of the lamp housing part and provided between the two protruding sections, and wherein the two frame extension regions are interposed between the protruding sections and the extension sections.

16. A lamp for a vehicle, the lamp comprising:

a lamp housing part configured to accommodate a light source in an internal lamp housing part space defined therein;

an outer lens part coupled to one side of the lamp housing part and configured to cover the internal lamp housing part space; and a vibration part fixed to the outer lens part, wherein the vibration part comprises:

a first module fixed to a first side of the outer lens part; and a second module fixed to a second side of the outer lens part and configured to face the first module, wherein the first module comprises a first magnet, and wherein the second module comprises:

a second magnet configured to face the first magnet;

a second magnet fixing portion configured to accommodate the second magnet; and a coil member provided at one side of the second magnet and accommodated in the second magnet fixing portion.

17. The lamp of claim 16, wherein the outer lens part comprises two first protruding sections protruding from an inner surface of the outer lens part and spaced apart from each other, wherein the second magnet fixing portion comprises:

a frame body region configured to accommodate the second magnet and the coil member in a frame body region internal space defined therein; and two frame extension regions being configured to extend from opposite sides of the frame body region, and wherein the two frame extension regions are inserted between the two first protruding sections.

18. The lamp of claim 17, wherein the two first protruding sections protrude from a region of the inner surface of the outer lens part that extends in a direction intersecting a horizontal direction, and wherein a second protruding section is bent from the two first protruding sections and connects the two first protruding sections.

19. The lamp of claim 18, wherein the second magnet fixing portion is inserted into a space defined by the two first protruding sections and the second protruding section.

20. The lamp of claim 19, wherein the second magnet fixing portion and the second protruding section are configured to be in contact with each other, wherein a first concave-convex portion having a concave-convex shape is formed in a region of the second magnet fixing portion that faces the second protruding section, and wherein a second concave-convex portion, which is configured to engage with the first concave-convex portion, is formed in a region of the second protruding section that corresponds to the first concave-convex portion.

* * * * *